INVENTORS: H. SEIDEL
D. L. WHITE
BY
*Sylvan Sherman*
ATTORNEY

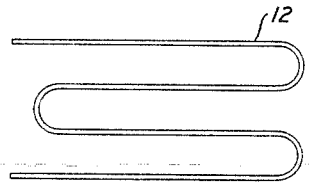
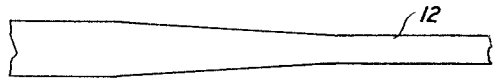
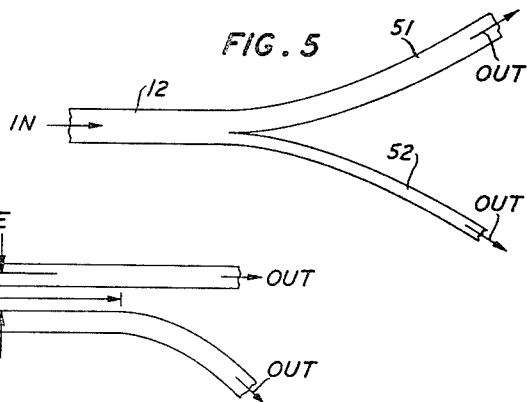
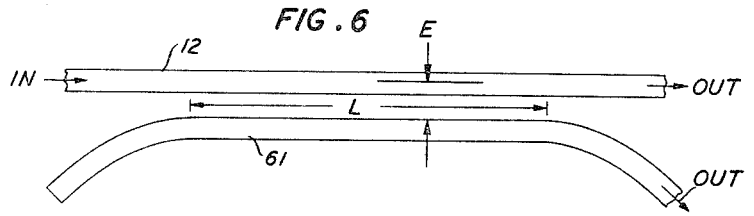
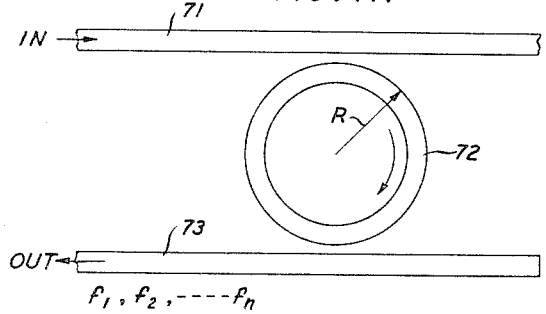
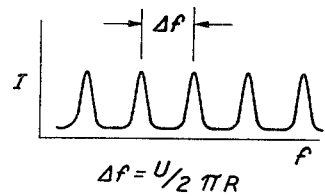
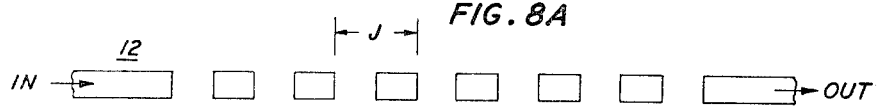
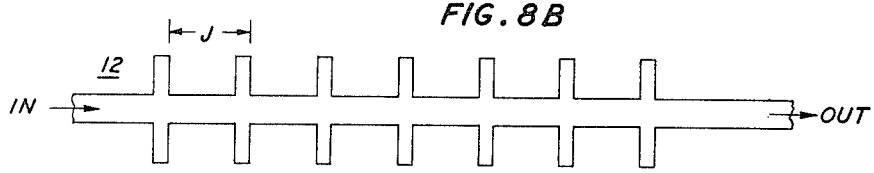

United States Patent Office 3,406,358
Patented Oct. 15, 1968

3,406,358
ULTRASONIC SURFACE WAVEGUIDES
Harold Seidel, Warren Township, Somerset County, and Donald L. White, Mendham, N.J., assignors to Bell Telephone Laboratories, Incorporated, Berkeley Heights, N.J., a corporation of New York
Filed Oct. 30, 1967, Ser. No. 678,891
19 Claims. (Cl. 333—71)

ABSTRACT OF THE DISCLOSURE

This application discloses arrangements for guiding elastic bulk-mode and surface-mode waves which substantially eliminate beam spreading. Bulk-mode wave guidance is produced by forming, in an elastic wave supporting medium, a longitudinally extending perturbation which either decreases the net longitudinal phase velocity in the body or increases its net longitudinal attenuation. Surface-mode wave guidance is produced by forming a similar perturbation on the surface of an elastic wave supporting substrate. The surface wave guiding structures, which can be produced by simple photoetching processes, can be readily adapted to form a wide variety of elastic wave circuit devices such as filters, power dividers and directional couplers.

---

This invention relates to elastic wave guiding structures and circuit devices.

Background of the invention

Elastic wave devices are used in a variety of applications. One of the better known uses is in delay lines to provide delay or storage of signal pulses in certain radar systems, computer memories and switching systems. In addition, the relatively recent development of elastic wave circuit devices such as amplifiers, modulators, detectors and filters opens up the possibility that certain circuit functions, which are relatively difficult or expensive to perform electronically, can be carried out acoustically.

A typical prior art delay line comprises a uniform elastic wave-supporting medium disposed between a pair of transducers. In operation, one of the transducers is excited by an electrical input signal and induces an elastic wave in the medium. The wave propagates through the medium as a shear or longitudinal wave and impinges upon the second transducer which reconverts the elastic wave into an electrical signal at the output. Since the velocity of propagation of an elastic wave is much lower than that of an electrical signal, delays that are large compared to the time of typical electronic operations can thus be obtained.

One serious limitation on the operation of such delay lines, however, is the loss of energy due to beam spreading. When the elastic wave travels beyond the Fresnel length, it begins to spread over an area proportional to the distance squared. If the delay line is long, the beam eventually spreads beyond the transverse boundaries of the line and spreads into the surrounding medium. Thus, either the length of the delay line must be limited, or the system must be designed to operate in spite of a substantial loss of energy.

Brief summary of the invention

In an elastic wave guiding structure in accordance with the invention, the propagation constants of the surrounding medium are chosen to prevent beam spreading. In particular, it has been discovered that an elastic wave mode can be guided in an elastic wave supporting medium having uniform elastic properties in at least one transverse direction by creating an appropriate perturbation in the medium. In particular, such a perturbation either decreases the longitudinal elastic wave phase velocity of the body or increases its net elastic wave attenuation. To provide guidance, the perturbed region extends in the longitudinal direction but has a localized transverse cross section. In general, such regions can comprise either constitutive or geometrical perturbations in the body of the supporting medium.

Brief description of the drawings

The above-mentioned and other objects and advantages of the invention will be more readily understood from the following discussion taken in conjunction with the accompanying drawings in which:

FIG. 2b, included for purposes of explanation, shows the distribution of elastic wave energy for the embodiment of FIG. 2a;

FIGS. 4a, 4b, and 4c illustrate elastic wave delay lines;

FIG. 5 shows an illustrative embodiment of an elastic surface wave power divider;

FIG. 6 shows an illustrative embodiment of an elastic wave directional coupler;

FIG. 7a illustrates a resonant elastic wave device in accordance with the invention;

FIG. 7b, included for purposes of illustration, shows the spacing of the resonant frequencies;

FIGS. 8a and 8b illustrate two elastic wave filters;

Similar reference characters are applied to similar elements throughout the drawings.

Detailed description of the drawings

Figure 1B:
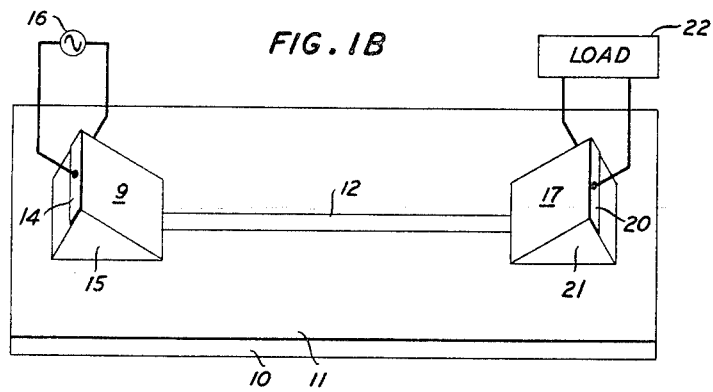
FIGS. 1a and 1b show two illustrative embodiments of elastic wave guiding structures, in accordance with the invention.
Figure 1A:
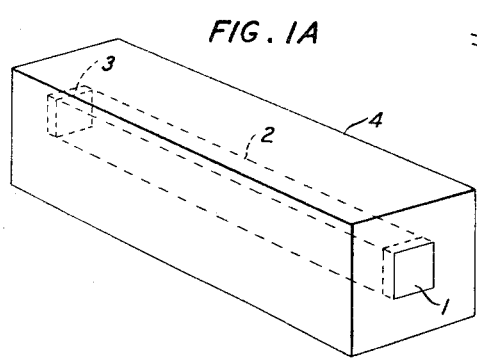

Referring to the drawings, FIGS. 1a and 1b show two illustrative embodiments of guiding structures in accordance with the invention.

More specifically, FIG. 1a shows an embodiment comprising a bulk-mode elastic wave guiding structure comprising a body 4 of elastic wave supporting medium. In general, the body need not have any particular shape but is characterized by uniform elastic properties in at least one direction transverse to the direction of wave propagation. Conveniently, the body comprises a low loss, elastically isotropic material. Disposed within body 4, and extending in the direction of wave propagation, i.e., the longitudinal direction, is a guiding region 2, comprising a perturbaton adapted either to reduce the net longitudinal phase velocity of the body, as compared to an unperturbed body, or to increase its net attenuation. For example, the perturbed guiding region 2 can comprise an elongated cylinder of a material having a lower elastic wave phase velocity than the medium. In general, observable guidance is produced when the ratio between the phase velocity of the guiding region and that of the medium is less than 99.5%. Structures having a ratio between 99% and 50%, however, are particularly useful because they can be used in making elastic wave circuit devices utilizing coupled guiding regions. Alternatively, guiding structure 2 can comprise an elongated cylinder of a material having a higher intrinsic dissipation than that of the medium. In general, useful guiding structures are produced in an essentially loss free medium by creating a perturbation which results in a net longitudinal loss of between 1 and $\frac{1}{10}$ percent per wavelength of travel. In addition, a single perturbation can produce guidance by both of the aforementioned mechanisms. For example, gold in a fused quartz medium produces guidance by both lowering the phase velocity and increasing the attenuation.

In general, a guiding region having any arbitrary transverse cross section will produce guidance. However, if it is desired to limit guidance to the fundamental mode, the cross section advantageously comprises a rectangle whose length and width are each less than a half wavelength of the shortest wavelength elastic wave to be propagated therealong. Disposed at opposing ends of the guiding region are transducers 1 and 3 for launching and receiving bulk-mode elastic waves.

In operation, transducer 1 launches an elastic wave into the guiding region 2. The wave is guided down the length of the region between transducers 1 and 3 with no significant beam spreading.

FIG. 1b shows a schematic view of an elastic surface-mode guiding structure, in accordance with the invention, comprising a substrate 10 having a smooth upper surface 11 and a guiding strip 12 disposed thereupon. Surface wave transducers 9 and 17, for launching and receiving surface waves, respectively, are located at opposite ends of guiding strip 12.

Substrate 10 can be any material which is capable of supporting elastic waves and has uniform elastic properties in at least one direction transverse to the direction of wave propagation. Advantageously, the substrate is low-loss for elastic waves and is elastically isotropic. The upper surface 11 of the substrate is advantageously polished smooth so that any irregularities are much smaller than a wavelength of the highest operating frequency.

Surface wave transducers 9 and 17 can be any one of a number of well-known transducers. For example, the surface wave transducers shown comprise bulk wave transducers 14 and 20 bonded to wedge-shaped members 15 and 21, respectively, as is described in detail in Patent 3,289,114, granted to J. H. Rowen on Nov. 29, 1966. An electrical input signal source 16 is coupled to input transducer 9, and a load 22 is connected between the terminals of output transducer 17. Alternate arrangements for producing surface waves, together with a mathematical analysis of surface waves (also called Rayleigh waves), may be found in the following publications:

"Surface Waves at Ultrasonic Frequencies" by E. G. Cook and H. E. Van Valkenburg, ASTM Bulletin, May 1954, pp. 81–84;

"Inspection of Metals with Ultrasonic Surface Waves" by Willard C. Minton, Nondestructive Testing, July-August 1954, pp. 13–16;

and, "Investigation of Methods for Exciting Rayleigh Waves" by I. A. Viktorov, Soviet Physics-Acoustics, Vol. 7, No. 3, January-March 1962, pp. 236–244.

Guiding strip 12, to be described in greater detail hereinbelow, is disposed upon smooth surface 11 of substrate 10, between input and output transducers 9 and 17. In general, surface-wave guidance is produced by a perturbation on the surface of the supporting medium which lowers the elastic surface wave phase velocity or raises the net attenuation. Typically, this means that the perturbation comprises a strip of material having either a lower phase velocity or a higher intrinsic loss than the material of the substrate. However, as will be shown below, it is also possible to produce the guiding strip from the same material as the substrate. In general, the greater the difference between the velocity or intrinsic dissipation of the strip and the corresponding propagation parameter of the substrate, the stronger the guidance, i.e., the larger the proportion of energy that is confined about the strip region.

Figure 2A:
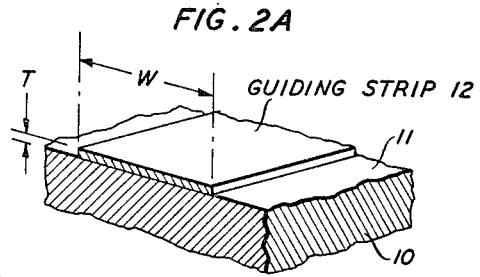
FIG. 2a shows a particular embodiment of the invention for guiding elastic surface waves by means of velocity perturbation.

FIG. 2a shows a cross section of one embodiment of the invention for guiding elastic waves by means of velocity perturbation. In this embodiment, guiding strip 12 is a rectangular strip of relatively low velocity material, such as gold. The strip is disposed upon the smooth planar surface 11 of a higher velocity substrate 10, such as fused quartz. More precisely, the materials of the strip and the substrate are chosen so that the magnitude of the surface wave velocity of the strip material is less than that of the substrate without the strip. In general, the lower the ratio of strip velocity to substrate velocity, the stronger the guidance. However, as will become evident from the discussion hereinbelow, it is advantageous in many applications that the elastic wave energy not be completely confined to the strip. It has been found that typical useful velocity ratios lie between 99% to 50%.

The dimensions of the rectangular strip can advantageously be chosen to suppress unwanted modes. In particular, bulk-mode waves can be suppressed by making the thickness, T, less than $\frac{1}{10}$ of a wavelength, and higher order surface-mode waves can be suppressed by making the width, W, less than one-half of a wavelength. However, if it is desired to utilize the higher order surface-modes, or to suppress them in another manner, the strip can be wider. This form of guiding strip can readily be fabricated by well-known electroplating or photomasking techniques.

Figure 2B:
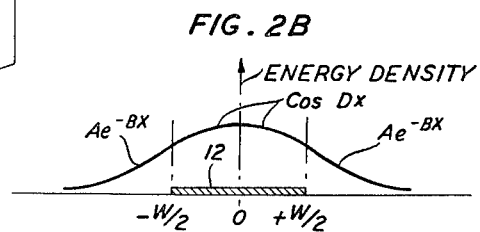

FIG. 2b shows the distribution of first order mode energy over the surface of a typical velocity guiding structure of the type described above. The guiding strip 12 is shown on the same scale for ease of reference. The curve has the form $Ae^{-Bx}$ outside the strip, and $C \cos Dx$ inside it. In these expressions, A and C are constants describing the amplitude of the vibration; and B and D are related to the free surface wave phase velocity, V, the guided surface wave velocity U, and the wavelength L, by the formulas $$B = \frac{2\pi}{L}\sqrt{2\frac{(V-U)}{V}}$$

and $$D = \frac{2\pi}{L}\sqrt{2\frac{(U-P)}{V}}$$

where P is the phase velocity of a strip of infinite width. It should be particularly noted that a substantial portion of the energy is distributed over a portion of the substrate just outside the guiding strip. This phenomenon permits the design of coupling devices. In particular, by controlling the shape of the guiding strip, or by placing a plurality of strips close together so that they interact with one another, a variety of different elastic surface wave devices can be devised, as will be shown hereinbelow.

Figure 3:
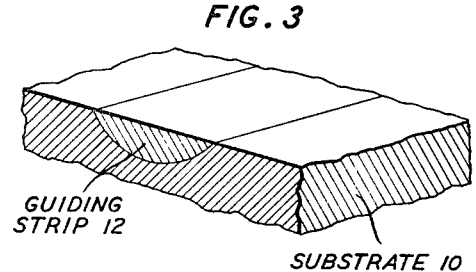
FIG. 3 shows an illustrative embodiment of the invention for guiding elastic surface waves by means of a loss perturbation.

FIG. 3 illustrates an example of an alternate guiding arrangement utilizing loss guidance. In this embodiment, a strip 12 of relatively lossy material is disposed on a relatively low-loss substrate 10. In general, the greater the difference between the intrinsic loss of the strip and that of the substrate, the stronger the guidance. Obviously, the loss in the structure should not be so great as to preclude useful transmission lengths. Typically, guiding structures having a net loss of between one and one-tenth percent per wavelength are useful.

Strip 12 can be formed in the substrate itself by irradiating a strip-like portion of a piezoelectric photoconducting substrate with light, or, alternatively, it can be formed in a susceptible substrate by irradiating a strip with neutrons. Another technique for forming a loss guiding structure is simply to deposit a strip of lossy material upon a relatively loss-free substrate.

As in the velocity perturbation guiding arrangement, the dimensions of the guiding strip are chosen to suppress bulk-modes and higher order surface-modes. This means that the width is less than one-half wavelength. However, the maximum permissible thickness depends upon the type of strip. If the strip is formed within the substrate, as illustrated, the thickness can be as great as one-half wavelength. But if the strip is deposited upon the substrate it is advantageously less than about one per cent of a wavelength.

The energy distribution of the loss guiding structure is substantially the same as that illustrated for a velocity guiding structure.

Figure 4A:
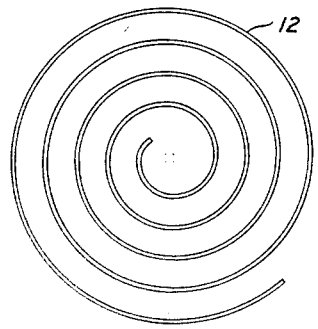

The guiding structures of FIGS. 1a and 1b can be used as elastic wave delay lines, convenient forms of which are illustrated in FIGS. 4a, 4b, and 4c. In particular, FIG. 4a shows a delay line in which the guiding region 12 is formed in a spiral for compactness. (In general, guiding structures in accordance with the invention can be curved so long as the radius of curvature is large compared to a wavelength.) FIG. 4b shows an alternate configuration in which the guiding region is folded. FIG. 4c shows a delay line in which the width of the guiding strip is tapered to control its dispersion. These delay lines have a number of advantages over those used in the prior art. One particularly significant advantage is that lines having very high Q's can be formed since there is insignificant loss of energy due to beam spreading. This is demonstrated by the fact that a delay line in accordance with the invention has been built over a Q of 7000.

A second advantage, applicable to the hereinabove described surface guiding structures, is ease of fabrication. These surface wave delay lines can be made on substrates by such inexpensive processes as, for example, photoresist techniques. In addition, as will be explained in greater detail hereinbelow, a variety of information processing devices such as, for example, frequency sensitive tapes can be easily incorporated into the surface wave delay lines.

Because surface wave guiding structures can be made economically and with great precision, and because closely spaced adjacent structures couple energy between them, a wide variety of practical surface wave circuit devices are feasible. FIG. 5, for example, illustrates a guiding strip configuration useful as a power divider. As illustrated, the power divider comprises a main guiding strip 12 which divides into two branch strips 51 and 52. The transition into the branches is advantageously smooth and gradual in order to prevent reflection and mode conversion. In general, the branch strips do not have the same width. Thus, branch strip 51 is shown to have a greater width than branch 52.

Elastic wave energy propagating down main strip 12 divides and flows into each of the two branch strips. In general the power divides in a ratio which depends upon the location of the dividing point with respect to the center of strip 12. More specifically, that portion of the energy in the energy distribution which is to the right of the dividing point flows into the right-hand branch strip 51 and that portion which is to the left flows into the left branch 52. Since the division illustrated is to the right of center, less power flows into the right branch 51 than into the left branch.

FIG. 6 illustrates an example of a guiding strip configuration for producing directional coupling. The coupling arrangement comprises a main guiding strip 12 and a secondary strip 61 which passes sufficiently close to strip 61 over a sufficiently long distance to couple a predetermined proportion of the energy from strip 12 to strip 61.

In particular, the distance between the two strips over the coupling interval is such that relatively weak coupling is produced, thus avoiding a significant impedance mismatch in strip 12. A rough criterion for this distance is obtained by considering the energy distribution of FIG. 2. For these purposes, weak coupling can be said to exist if less than ten percent of the energy normally associated with strip 12 is included in the region extending outward from the near edge of strip 61. This corresponds to values of E, the distance from the center of strip 12 to the near edge of strip 61, greater than $3/2B$, where B is as defined in the description of FIG. 2.

The length L of the coupling region over which the two strips coextend can be chosen to divide the power between them in any desired ratio. The fraction of the energy that is coupled per wavelength is approximately equal to the fraction of the energy that extends beyond the near edge of strip 61.

A tapped delay line can be produced by placing a plurality of couplers adjacent to a delay line at certain specified intervals. This results in a delay line which has many outputs, each output having a different delay.

Coupling can also be frequency selective, as illustrated in the resonant coupling arrangement of FIG. 7a. In particular, FIG. 7a shows a resonant coupler comprising a first guiding strip 71, a second strip in the form of a closed loop 72, weakly coupled to first strip 71, and a third strip 73 weakly coupled to loop 72. In general, loop 72 is resonant whenever the loop circumference is equal to an integral multiple number of wavelengths. Energy at these resonant frequencies builds up in the loop and, in turn, is coupled into strip 73. In the particular example illustrated in FIG. 7a, the loop is a circle of radius R. Thus, coupling occurs for a plurality of signal components at frequencies $f_1, f_2, \ldots$, spaced apart an increment $\Delta f = U/2\pi R$, where U is the guided surface wave velocity.

Figure 8C:
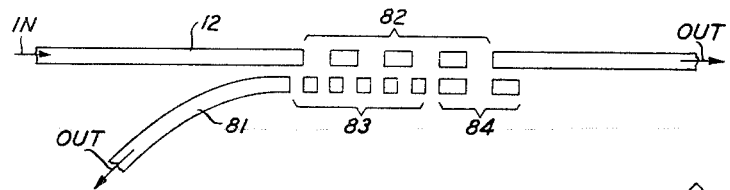
FIG. 8c illustrates a frequency sensitive elastic wave coupling device.

FIGS. 8a, 8b and 8c illustrate examples of elastic wave filters in accordance with the invention. In general, if a guiding strip is disturbed at regularly spaced intervals, such as by periodic discontinuities along the strip, band-limiting properties are produced. FIG. 8a shows a filter configuration comprising a guiding strip 12 from which portions have been removed at regular intervals, J. In general, such a structure tends to have a transmission minimum at frequency $U/2J$ and a maximum at frequency $U/4J$, where U is the velocity of the guided wave. However, either one of these effects can be selectively emphasized by controlling the thickness of the guiding strip and the number of periodic discontinuities. In particular, when the strip is relatively thin, for example less than one percent of a wavelength and the number of discontinuities is small (for example, less than 10), the structure acts primarily as a band-rejection filter centered at frequency $U/2J$. On the other hand, when the strip is relatively thick, i.e., a few percent of a wavelength and the number of discontinuities is large (for example, greater than 50), the structure acts primarily as a bandpass filter centered at frequency $U/4J$.

An alternative filter structure having similar properties can be produced by periodically loading the strip. FIG. 8b illustrates such a structure in which the strip is loaded by periodically increasing its width. The greater the increase in width, the greater the loading effect. Thus, a band-rejection filter is produced by increments in width that are small compared to the cross section of energy distribution, and a bandpass filter is produced by increments that are comparable with the energy cross section.

FIG. 8c shows a frequency sensitive coupler which combines the features of the above-described filter arrangements with those of a directional coupler to produce an arrangement which couples only a preselected frequency. In this arrangement, a strip 81 is weakly coupled to a main guiding strip 12 over a coupling interval that is sufficiently long to produce complete transfer of energy from strip 12 to strip 81. In addition, the coupling interval along strip 12 comprises a band-rejection filter 82 centered at frequency $f$, while the coupling interval along strip 81 comprises a bandpass filter 83. Advantageously, strip 81 is terminated at one end by a section of band-rejection filter 84.

In operation, the out-of-band portion of a broadband signal propagating along strip 12 is transmitted past band-rejection filter 82, while that portion of the wave energy centered about frequency $f$ is coupled onto strip 81. Filter 84 serves the useful function of reflecting any coupled energy centered about frequency $f$ which tends to propagate in the wrong direction. Because filter 83 is a bandpass filter for energy centered around frequency $f$, little out-of-band energy is coupled onto strip 81.

Figure 9:
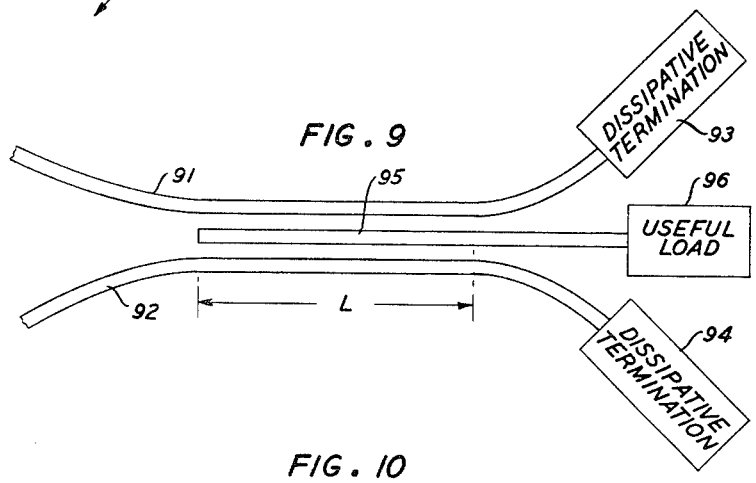
FIG. 9 shows an illustrative embodiment of an elastic wave logic device.

FIG. 9 illustrates a guiding strip configuration which can be used to perform certain logic functions acoustically. In this figure there is shown a pair of guiding strips 91 and 92, each having a dissipative termination, 93 and 94, such as indium dot, at one end. Each of the strips is weakly coupled to a third strip 95 over a coupling region of length L. Strip 95 is, in turn, coupled to a useful load 96. In operation, various logic functions can be performed by the controlled transfer of energy among these strips.

The configuration is used as an "exclusive OR" gate by taking advantage of the fact that when pulses are on both strips 91 and 92, each pulse is coupled to strip 95 in one-half the distance required for coupling when a pulse is on only one of the two strips. More specifically, the length L of the coupling interval is chosen such that when a pulse is traveling down only one of the two strips 91 or 92, the pulse energy is completely transferred to strip 95. Thus, a pulse on only one strip produces an output pulse at the load. However, if there are pulses on both strips 91 and 92, a complete transfer of energy is accomplished in a distance $L/2$. Thus, during travel down the first half of the interval L, the energy is coupled from strips 91 and 92 to strip 95. However, over the second half of the interval it is transferred back from strip 95 to strips 91 and 92, producing no output pulse at load 96.

On the other hand, the configuration can be used as an "AND" gate by increasing the length of the coupling region by about 50 percent to a length $\frac{3}{2}L$. In this case, when there is a pulse on only one of the strips 91 or 92, the energy is first coupled from the one strip to strip 95 over a coupling interval L. The energy is then coupled back to both strips 91 and 92, with half going to each, over the remaining interval $L/2$. Thus, no output is produced at load 96. However, when pulses are present on both strips 91 and 92, the distance required for complete transfer from each strip to strip 95 is halved and the pulse is again transferred back to strip 95. In particular, both pulses are transferred to strip 95 in the first interval $L/2$; they are transferred back to strips 91 and 92 in the second interval $L/2$; and they are again transferred to strip 95 in the last interval $L/2$. Thus an output pulse is produced at the useful load.

Figure 10:
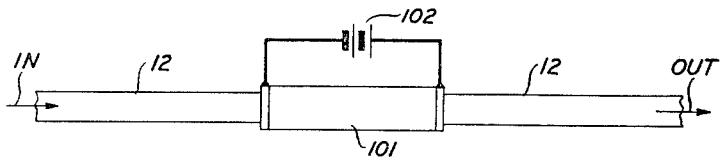
FIG. 10 shows an illustrative embodiment of an elastic wave amplifier.

FIG. 10 illustrates an example of an amplifier in accordance with the invention. As illustrated, the amplifier comprises a strip 101 of an appropriate semiconductor material disposed on the substrate 10 between two portions of a guiding strip 12. In addition, a voltage source 102 is adapted to provide a D.C. bias across the semiconductor strip in the longitudinal direction. Semiconductor strip 101 can comprise an ordinary semiconductor such as Si or Ge, if substrate 10 is a piezoelectric material, or a piezoelectric semiconductor such as CdS or ZnO if the substrate is not itself piezoelectric. The length of the semiconductor strip can be anything from a few wavelengths to several hundred wavelengths, depending upon the amount of amplification desired.

In operation, sufficient voltage is applied across the semiconductor strip such that the average drift velocity of the electrons (in the direction of elastic wave propagation) exceeds the velocity of wave propagation. The interaction between the electrons and the piezoelectric field produces an amplification of the elastic waves propagating along the strip. This principle of operation is described in greater detail in connection with a bulk-mode amplifier in United States Patent 3,158,819 issued to P. K. Tien on Nov. 24, 1964.

Figure 11:
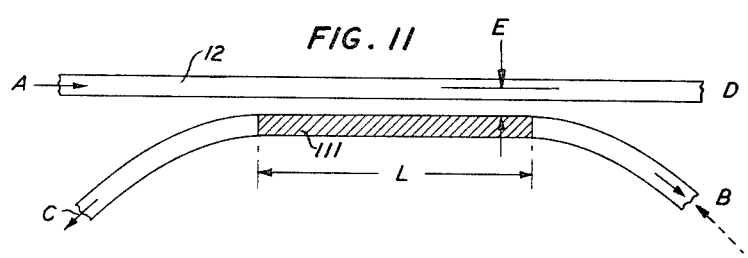
FIG. 11 shows an illustrative embodiment of a nonreciprocal elastic wave device.

A nonreciprocal coupling device can be made by applying an appropriate magnetic material to a directional coupler. In FIG. 11 there is shown a directional coupler, similar to that shown in FIG. 6, comprising a main guiding strip 12 and a coupled strip 61. However, the strip is altered by the presence of a special magnetic layer 111 extending over the coupling interval. In the embodiment shown, the magnetic material is in strip 61.

As is well known, certain magnetic substances demonstrate nonreciprocal properties in that the velocity of elastic wave propagation through them in one direction is not equal to the velocity in the reverse direction. It is equally well known that the maximum amount of power that can be transferred from between two wave paths decreases as the phase velocities of the two paths become more and more unequal. (See S. E. Miller, Coupled Wave Theory and Waveguide Applications, Bell System Technical Journal, Vol. 33, May 1954.) Thus, the use of a magnetic material having nonreciprocal phase velocities can be used to produce a nonreciprocal coupling device.

A circulator, for example, is formed by disposing the magnetic material along the coupling interval of strip 61 in a directional coupler as illustrated in FIG. 11. In the direction where phase velocities are equal, substantially all the energy is coupled between strips, (from strip 12 to strip 61). However, in the reverse direction, the phase velocities are unequal and only a very small portion of the energy is transferred. Thus energy entering port A leaves port B; energy entering at port B leaves at port C; that entering at port C leaves at port D and that entering at port D leaves at port A. Hence, the energy circulates from A to B to C to D to A.

Figure 12:
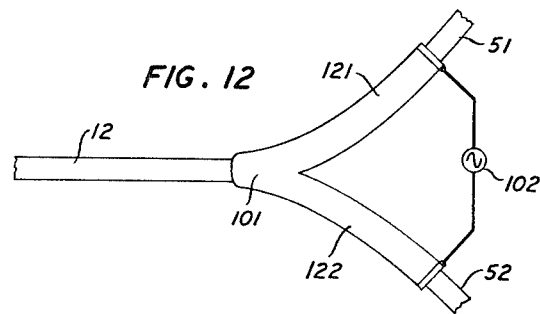
FIG. 12 shows an illustrative embodiment of an elastic wave switch.

FIG. 12 illustrates a device which combines the features of the power divider described in connection with FIG. 5 and the amplifier described in connection with FIG. 10 to make a switching arrangement. As is illustrated, a semiconductor strip 101 is formed in a Y shape with a pair of branches 121 and 122. Main guiding strip 12 is coupled to the center portion of the Y and branch strips 51 and 52 are connected to branches 121 and 122, respectively.

In operation, the reversal of the polarity of biasing source 102 switches acoustic energy between branches 51 and 52. More specifically, elastic wave energy propagating along strip 12 divides into two parts, one part entering semiconductor branch 121 and the other entering 122. However, when the appropriate biasing voltage is applied across amplifier 102, the direction of electron flow will be the same as the direction of wave propagation in only one branch, but opposite to the direction of propagation in the other. The result is that elastic wave energy in the one branch is amplified, but attenuated in the other. Reversal of the polarity switches the direction of electron flow in both branches. Hence, when semiconductor branch 121 is connected to the positive terminal of source 102, the signal is coupled to branch strip 52. However, when the polarity is reversed, the signal is coupled to branch strip 51.

In all cases, the above-described arrangements are merely illustrative of a small number of the many possible specific embodiments which can represent applications of the principles of the invention. Thus numerous and varied other arrangements can be readily devised in accordance with these principles by those skilled in the art without departing from the spirit and scope of the invention.

What is claimed is:
1. A structure for guiding a wave containing elastic wave energy comprising:
    a body capable of supporting elastic wave energy, the cross section of said body comprising a bulk portion having uniform elastic properties in at least one direction and a localized perturbed portion having different elastic properties, said different elastic properties being such that the presence of the perturbed region reduces the effective longitudinal phase velocity of the body;

means for coupling wave energy selectively into said localized perturbed portion for longitudinal travel throughe said body;

and means for coupling wave energy out of said localized perturbed portion after its travel through said body.

2. A guiding structure according to claim 1 wherein: said localized perturbed portion comprises a material having a lower elastic wave phase velocity than the bulk portion of said body.

3. A guiding structure according to claim 2 wherein: the elastic wave phase velocity of said perturbed portion of said body is between 99% and 50% of the velocity of said bulk portion.

4. A guiding structure according to claim 1 wherein: said localized perturbed portion comprises a cylinder of material having a rectangular cross section and a lower elastic wave phase velocity than the bulk portion of said body;

and wherein said energy coupling means are adapted to couple bulk-mode elastic waves.

5. A structure for guiding a wave containing an elastic surface wave comprising:

a body of an elastic wave supporting medium having at least one smooth surface characterized by uniform elastic properties in a transverse direction;

longitudinally extending means having a localized transverse cross section for reducing the net longitudinal elastic surface wave velocity of said surface;

and means for coupling elastic surface waves to and from said longitudinally extending means.

6. A guiding structure according to claim 5 wherein: said longitudinally extending means comprises a material having a lower elastic wave phase velocity than said medium.

7. A structure for guiding a band of elastic surface waves comprising:

a body of an elastic wave supporting medium having at least one smooth surface characterized by uniform elastic properties in a transverse direction;

a longitudinally extending guiding strip disposed upon said body, said strip having a thickness that is small compared to the length of the shortest wavelength energy within said band and an elastic wave phase velocity which is less than that of the supporting medium;

means for launching said band of elastic surface waves for propagating along said guiding strip;

and means for receiving said elastic surface waves coupled to said strip.

8. A guiding structure according to claim 7 wherein: said guiding strip is characterized by a thickness of less than 10 percent of said shortest wavelength.

9. A guiding structure according to claim 5 wherein: said guiding strip is characterized by an elastic wave phase velocity that is between ½ and 9/10 that of said supporting medium.

10. A guiding structure according to claim 9 wherein: said guiding strip is characterized by a width which is less than one-half of said shortest wavelength.

11. A guiding structure according to claim 7 wherein: said elastic wave supporting medium is characterized by a thickness of at least a few multiples of the length of the longest wavelength energy within said band.

12. An elastic surface wave power divider comprising a guiding structure according to claim 7 wherein: said guiding strip divides into a plurality of branch guiding strips.

13. An elastic surface wave directional coupler comprising:

an elastic wave supporting substrate;

a pair of surface wave guiding strips disposed upon said substrate and weakly coupled together over an interval;

and means for coupling surface wave energy into and out of said structure.

14. An elastic surface wave directional coupler comprising:

a body of an elastic wave supporting medium having at least one smooth surface characterized by uniform elastic properties in a transverse direction;

first and second guiding strips, characterized by an elastic wave phase velocity which is less than that of the supporting medium, disposed upon said surface and weakly coupled together over an interval;

means for launching a band of elastic surface waves for propagating along said first guiding strip;

and means for receiving said elastic surface waves coupled to each of said guiding strips.

15. An elastic surface wave directional coupler according to claim 14 wherein:

said surface waves propagating down said first strip are characterized by a transverse elastic wave energy distribution;

and said second strip having its near edge located sufficiently far from said first guiding strip over said coupling interval such that less than 10 per cent of the energy associated with said wave extends to the outside of said near edge.

16. An elastic surface wave directional coupler according to claim 15 wherein:

said transverse elastic wave energy distribution is of the form $Ae^{-BX}$ beyond the edges of said first strip, where B is a constant and X is the distance from the center of said first strip;

and the near edge of said second strip is at a value of X greater than $3/2B$.

17. An elastic surface wave filter comprising a guiding structure according to claim 7 having:

a plurality of discontinuities extending over a portion of the guiding strip length.

18. An elastic surface wave filter according to claim 17 wherein:

said discontinuities comprise a series of breaks in said guiding strip.

19. An elastic surface wave filter according to claim 17 wherein:

said discontinuities comprise a series of regions along said strip of increased width.

References Cited

UNITED STATES PATENTS 3,289,114  11/1966  Rowen _____ 333—30

OTHER REFERENCES

Einspruch, "IEEE Spectrum," March 1966, pp. 116–124.

ROY LAKE, *Primary Examiner.*

DARWIN R. HOSTETTER, *Assistant Examiner.*